Patented Mar. 16, 1926.

1,577,217

UNITED STATES PATENT OFFICE.

HERMAN FLECK, OF GOLDEN, AND WILLIAM G. HALDANE, OF DENVER, COLORADO.

ART OF EXTRACTING METALLIC VALUES FROM ORES, CONCENTRATES, AND THE LIKE.

No Drawing.   Application filed August 8, 1922.   Serial No. 580,541.

*To all whom it may concern:*

Be it known that we, HERMAN FLECK and WILLIAM G. HALDANE, citizens of the United States, and residents, respectively, of Golden, in the county of Jefferson and State of Colorado, and Denver, in the county of Denver and State of Colorado, have invented a new and useful Improvement in the Art of Extracting Metallic Values From Ores, Concentrates, and the like, of which the following is a specification.

Among the objects sought to be obtained by the practice of the hereinafter described improvement in the art of extracting metallic values from ores, concentrates and other products in which the sought for values are found, we would particularly mention first. material reduction in the excessive cost of recovering such values due to the intermingling of very large quantities of sand and earthy matter with the desired values. and also the recovery for re-use of substantial portions of the re-agents used in the extraction process. While this improvement is particularly applicable to the recovery of radium, vanadium uranium and other values from carnotite bearing ores, concentrates and the like, it will be understood that the underlying principle is applicable to the treatment of any substance where it is desired to eliminate large quantities of silica or silica compounds that are present and which render difficult the economical extraction of the desired substances.

In the extraction of radium and other values from carnotite or other ores or concentrates, one of the great obstacles to economical extraction is the difficulty and expense of separating the more or less insoluble or refractory compounds containing the sought for values from the sand and earthy matter with which they are so intimately commingled. It has been proposed to treat this mixture of sands with the metal compounds that are not readily soluble, by putting the sand into a solution that can be decanted from the precipitate or residue containing the metallic compounds, but such a mode of treatment involves loss and waste of values since a substantial part of such values is carried off in the silica-containing solution from which recovery is not commercially practicable.

The present invention, however, provides a process which solves this problem by eliminating the silica apart from the soluble values, this being effected specifically by converting the silica into volatile fluorides which results in leaving all desired values in a concentrated form from which they may be extracted and separated economically.

For the purpose of illustrating the practical application of this improvement we will now describe its mode of use in extracting radium and other rare metal values from carnotite ores, such as are found in western Colorado and in Utah, in connection with the processes already set forth by us in Letters Patent of the United States numbered, respectively, 880,645 and 880,584, in order that the practical manipulation of the process may be clearly understood.

The preliminary part of the treatment may proceed in accordance with the said patented processes to the point where the readily soluble metallic values have been carried off in solutions containing the principal portions of the vanadium, uranium and some other bases, leaving behind a solid residue consisting of sand grains or sand and a finely divided material consisting largely of fine silicious matter in which are contained practically all the radium content of the ore and the other values not carried off in the aforesaid solutions.

With the stock solutions obtained in the above-mentioned patented processes we are not now directly concerned since the present invention relates to the treatment of the so-called radium-bearing slimes consisting principally of finely divided silicious matter containing radium and barium compounds probably as sulfates, as well as the lesser portions of the original uranium, vanadium and other metallic compounds.

Both the coarser sands and the finely divided slimes may be treated by our process for the elimination of silica, but, as in this case, the slimes contain practically all the radium and other values not previously carried off in solution, the sands will preferably be discarded after the slimes have been separated therefrom, mechanically or otherwise, by well-known methods, in order to be subjected to further treatment for the recovery of their values. In order to facilitate the most complete accumulation of the radium content in the slimes it is desirable, in the treatment of some ores, to add a small amount of suitable barium compound.

Usually the radium-bearing slimes will contain 40% to 70% silica, partly free and partly combined with bases. The freeing of these slimes substantially of their silica contents, provided it be done without taking along a substantial part of the sought for values, enormously aids in the prevention of loss of radium by absorption, besides avoiding handling or re-handling large quantities of material, and large volumes of solution, beside preventing other loss incidental to previously used extraction processes. Generally speaking, our process of treatment involves the removal of the silica content not by means of solutions, which necessarily carry off a substantial percentage of the contained values, but by direct elimination of the silica alone by putting it into volatile form by the use of any suitable re-agent used in such a manner as to volatilize the silica content. The invention further consists in the retention and conversion of the escaping gas or vapor for regenerating a substantial part of the chemical re-agent used in the process.

Specifically considered, in the treatment of the silicious radium-bearing slimes however obtained, we proceed as follows: The slime is treated in a suitable container with a fluoride and sufficient sulfuric acid to cause the formation of volatile silicon products, namely hydrofluosilicic acid and silicon tetrafluoride. After a period of digestion, preferably without the application of heat, the mass is heated thereby volatilizing the silicon in the form of silicontetra-fluoride or of hydrofluosilicic acid partially dissociated or a mixture of both.

The evolved gases are caught in a suitable manner, as for instance in a tower provided with a counter-current of water thereby yielding a solution of hydrofluosilicic acid or of the latter containing silicic acid in precipitated solid form. From this solution, developed to a suitable concentration, the fluoride is recovered by neutralization, filtration and evaporation in such manner as is desirable for the particular fluoride employed. For example, if sodium fluoride is used, the tower liquor is treated with a quantity of sodium carbonate necessary to form sodium fluoride and to precipitate the silica and silicic acid or the equivalent of caustic soda may be used at this point. This is followed by an excess of caustic soda which dissolves the silicic acid to form soluble sodium silicate and insoluble sodium fluoride, which are separated by suitable means. The latter is then used over again.

It is found preferable to use a fluoride whose base is a volatile constituent, examples of which are the fluorides of ammonium, both acid and neutral, or of the ammonium derivatives of both inorganic and organic nature. When these are used the volatile bases remain with the sulfuric acid, while, as before, the silica is converted into volatile fluorides which are conducted off and subjected to recovery treatment, but in this instance the base used in the recovery process of the fluoride is regenerated from the non-volatile part of the reaction product by suitable means.

For illustration let us assume the use of ammonium acid fluoride. Without confining ourselves to exact proportions or methods our procedure was as follows: To 500 pounds of radium-bearing slimes were added an amount of ammonium acid fluoride equal to twice the silica present. In this case 500 pounds of the said salt were added. The mixture was brought to a semifluid consistency, either with water added from without, or from the water content of the radium-bearing slimes or from the recovered and partially evaporated solution of ammonium acid fluoride hereinafter described, or from all three sources, in a suitable container. To this semifluid mass was added 1000 pounds of commercial sulfuric acid, 65 Baumé, in a thin stream and the mass was digested with or without stirring for several hours. The stiffened mass was then heated gradually and finally baked at moderate temperature. The heating usually lasts five to six hours.

The evolved gases thus volatilized from the mixture are collected in a tower provided with a countercurrent of circulating water or other suitable means.

When the reaction is complete, the mass is removed from the container and leached with water acidified with sulfuric acid, and there is added barium chloride sufficient to insure a proper barium-radium ratio. This whole mass is boiled and filtered resulting in a barium-radium-sulfate product containing from 700 to 1200 milligrams per ton of dry product which is now available for further refining by known processes.

The blue-green radium free filtrate drawn off from the mass, as above described, contains as sulfates in solution the vanadium, uranium and other metallic values and also the ammonia which was originally present as ammonium acid fluoride, and is now in the form of ammonium sulfate. This solution is run into a container suitable to serve as a still for the collection of the volatile vapors or gases and is there admixed with the necessary quantity of slaked lime or other caustic and is heated to drive off the ammonia which is caught and used to regenerate ammonium acid fluoride.

To accomplish such re-generation the tower liquor previously mentioned, consisting of hydrofluosilicic acid, is treated with the ammonia until the reaction, which forms soluble ammonium acid fluoride and precipitated silicic acid, is complete. The principal reaction apparently takes place as follows:

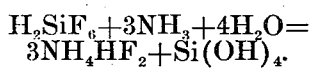

$$H_2SiF_6 + 3NH_3 + 4H_2O = 3NH_4HF_2 + Si(OH)_4.$$

The solution of ammonium acid fluoride (about 10%) is now filtered from the precipitate of silicic acid which is washed. The filtrate and the washings are then evaporated to suitable concentration of ammonium acid fluoride present, to permit its return for the purpose of effecting the first above-mentioned reaction between the fresh charge of radium-bearing slimes and sulfuric acid in order to volatilize the silicious content of the new charge as above described.

The residue remaining in the still or container, after the ammonia has been driven off, contains uranium, and vanadium values in the form of precipitate which may be filtered off and washed by any suitable means for effecting a recovery of these valuable constituents.

From the foregoing it will be seen that the chief part of the silicious content of the slimes is separately eliminated without carrying off with it any solution of the metallic values, leaving the metallic values for the economical treatment unhindered by the presence of a large mass of silica. From this residue of comparatively small mass it is a simple matter to separate the soluble constituents by means of a suitable solvent leaving the insoluble radium-bearing sulfates in a highly concentrated form for any suitable or known process of refining. It will also be observed that the process permits the re-generation of a volatilizing reagent by the retention or recovery of the volatilized silicon compounds and of the ammonia content introduced in the volatilizing reagent.

What we claim is:

1. The improvement in the art of extracting metallic values from their containing concentrates or slimes, which consists in mixing with the mass to be treated a reagent capable of converting the contained silicon into a volatilizable compound and allowing said compound to evaporate from the mass unaccompanied by any of the sought for values present, substantially as described.

2. The improvement in the art of extracting metallic values from their containing radium bearing ores, concentrates or the like, which consists in volatilizing the silicon content by means of a suitable reagent, separating the radium content in the residue by leaching off the soluble compounds present, thereby leaving the radium content in highly concentrated form available for refining and purification, substantially as described.

3. The improvement in the art of extracting metallic values from their containing ores, concentrates or the like, which consists in treating radium-bearing substances with a fluoride and sulfuric acid, forming volatile compounds of the silicon and recovering the fluoride reagent for further use.

4. The improvement in the art of extracting metallic values from their containing ores, concentrates or the like, which consists in treating a silicious radium-bearing substance with a fluoride salt of a volatile base, converting constituents of such substances into a volatile compound and liquid solutions, independently separating them from the radium constituent and then recombining part of such constituents to regenerate the fluoride salt of a volatile base.

5. The improvement in the art of extracting metallic values from their containing ores, concentrates or the like, which consists in treating radium-bearing silicious matter with a fluoride of a volatile base to remove the silicious matter in volatile form, removing soluble constituents by leaching and filtration, and thereafter recombining a portion of the volatilized silicon compounds with a portion of constituent material of said solution to regenerate the said fluoride reagent.

6. The above described process of reducing radium-bearing substances by volatilization of a refractory and detrimental constituent and then regenerating the volatilizing reagent out of constituents yielded by the process.

7. The above described process of concentrating radium-bearing substances by eliminating the silicious constituent by volatilization, substantially as described.

8. The above described process of extraction from substances containing silica mingled with the sought for values which consists in treating the substance with a fluoride compound containing ammonia and with sulfuric acid so as to volatilize the silicon content and form ammonium sulfate, leaching off the said sulfate with other soluble constituents, and recombining the ammonia obtained from the solution with the silicon compound driven off to regenerate the volatilizing reagent.

9. The above described process of extracting radium and other values from a silicious substance, which consists in eliminating the silica content in volatile form by means of an ammonium fluoride reagent, converting the released ammonia into ammonium sulfate, leaching of the soluble sulfates including the ammonium sulfate, treating the solution of sulfates with a suitable reagent to release the ammonia content and recombining said ammonia with the collected products of the volatilizing reaction to regenerate a fresh supply of volatilizing reagent.

10. The improvement in the art of extracting values from their ores or concentrates which consists in treating a silicious radium-bearing substance with a fluoride salt having a volatile base, decomposing the constituents of such substance partly into volatile form and partly into liquid solution which are separately removed from the radium constituent, then separating from such solution the volatile constituent of the fluoride salt for further use.

11. The process of reducing radium bearing substances mingled with silica by converting the silica constituent into volatile form by means of a suitable volatilizing reagent suitably applied and recovering therefrom material available for producing a further supply of volatilizing reagent.

In witness whereof, we have subscribed the above specification.

HERMAN FLECK.
WILLIAM G. HALDANE.